United States Patent [19]

Nakatani et al.

[11] Patent Number: 4,914,662

[45] Date of Patent: Apr. 3, 1990

[54] LASER WAVELENGTH STABILIZATION

[75] Inventors: Hajime Nakatani; Yoshibumi Minowa; Hitoshi Wakata; Haruhiko Nagai; Kenyu Haruta, all of Hyogo, Japan

[73] Assignee: Mitsubishi Denki Kabushiki Kaisha, Tokyo, Japan

[21] Appl. No.: 248,900

[22] Filed: Sep. 26, 1988

[30] Foreign Application Priority Data

Sep. 26, 1987 [JP] Japan .................................. 62-241067
Oct. 14, 1987 [JP] Japan .................................. 62-259936

[51] Int. Cl.$^4$ .............................................. H01S 3/13
[52] U.S. Cl. ......................................... 372/32; 372/29; 372/34; 372/92
[58] Field of Search ....................... 372/32, 28, 29, 26, 372/92, 38, 100; 378/102, 34

[56] References Cited

U.S. PATENT DOCUMENTS 4,410,992 10/1983 Javan .................................. 372/32
4,558,952 12/1985 Kulesh et al. ........................ 356/349
4,715,028 12/1987 McMahon et al. .................. 372/20

Primary Examiner—Léon Scott, Jr.
Attorney, Agent, or Firm—Oblon, Spivak, McClelland, Maier & Neustadt

[57] ABSTRACT

A laser wavelength is stabilized by deriving a portion of laser beam emitted from a wavelength variable laser oscillator, spectroscopically processing the laser beam portion by means of a wavelength monitor mechanism, measuring a spatial intensity distribution of the spectroscopically processed beam portion, spectroscopically processing light having a specific wavelength and measuring a spatial intensity distribution thereof, analyzing the measured spatial intensity distribution of the spectroscopically processed beam portion on the basis of the measured spatial intensity distribution of the spectroscopically processed light having the specific wavelength, and controlling wavelength of the laser oscillator according to a result of the analysis.

13 Claims, 4 Drawing Sheets

LASER WAVELENGTH STABILIZATION

BACKGROUND OF THE INVENTION

The present invention relates to a stabilization of laser oscillation wavelength.

FIG. 5 is a schematic illustration of such a conventional system for stabilizing laser wavelength as shown in IEEE Journal Quantum Electronics QE-14 ('78) 17. In FIG. 5, a laser oscillator 1 is equipped with a component for changing wavelength of laser oscillation beam 2 which is directed through a reflection mirror to a Fabry-Perot etalon 3. An output laser beam from the Fabry-Perot etalon 3 is detected by an optical detector 4 an output of which is supplied to a servo mechanism 5 to control wavelength of laser output of the oscillator 1.

Wavelength of laser beam from the laser oscillator 1 depends upon conditions of an optical resonator of the oscillator and, in the shown example, laser wavelength can be selected by changing an optical length of the resonator. However, a wavelength selected in this manner is hardly be stabilized due to thermal deformation or vibration of the resonator. In order to solve this problem, the shown system employs the Fabry-Perot etalon which ia a high resolution spectroscope to detect intensity of laser beam passed therethrough by means of the optical detector 4 upon which the servo mechanism 5 is actuated to stabilize laser wavelength. That is, the Fabry-Perot etalon is composed of a pair of mirrors having high flatness and disposed oppositely with a gap d therebetween and, by passing light therethrough at an angle $\theta$ with respect to mirror surfaces, it becomes to have a specific wavelength having center wavelength $\lambda$ m represented as follows:

$$\lambda m = (2nd \cos \theta)/m^2$$

where n is a refraction index of the gap and m is an integer. By using such Fabry-Perot etalon having high resolution, an intensity of $\theta$ m in wavelength distribution of laser oscillation is obtained.

FIG. 6 shows a curve (a) which shows a variation of resonator distance and peaked curves (b) which show corresponding change of beam intensity caused by a change of beam wavelength $\theta$ which results in beam intensity corresponding to the center wavelength $\theta$ m of the Fabry-Perot etalon. That is, the curve (b) show spectrum distribution of oscillation wavelength of the oscillator 1. A dip portion around the peak intensity of each curve (b) is called as ram dip.

When the resonator length is increased gradually within a section (c) corresponding to the ram dip, intensity of beam passed through the Fabry-Perot etalon decreases firstly and then starts to increase at a center wavelength of the dip. Therefore, by using the so-called "Stabilization using Phase Detection" in which the resonator length is changed by the servo mechanism 5, while detecting a direction of change of intensity of beam passed through the Fabry-Perot etalon, in such a way that wavelength is concentrated to a point at which the changing direction of beam intensity is changed, it is possible to fix the oscillation wavelength $\lambda$ to the center wavelength $\lambda$ m of the Fabry-Perot etalon.

The center wavelength $\lambda$ m of the Fabry-Perot etalon which provides a reference for wavelength stabilization tends to drift due to an unintended physical change of the Fabry-Perot etalon, such as change of mirror gap, change of environmental tempe-rature and/or change of pressure. In order to respond such drift of the center wavelength of the Fabry-Perot etalon, the system shown in FIG. 5 uses another laser 6 which is preliminarily stabilized in another way and another optical detector 8 for detecting intensity of light from the laser 6 passed through the Fabry-Perot etalon 3. The Fabry-perot etalon is designed such that it functions to provide a wave-length selector for laser wavelength from the laser 6 in such a way that an intensity of light from the Fabry-Perot etalon is substantially reduced when the selected wavelength of the Fabry-Perot etalon for the laser 6 is drifted by even a small amount. That is, drift of the Fabry-Perot etalon can be detected by monitoring intensity of light from the laser 6 and passed through the Fabry-Perot etalon by means of the optical detector 8. Such variation of light intensity detected by the optical detector 8 is fedback to the Fabry-Perot etalon by the servo mechanism 7 to stabilize the Fabry-Perot etalon.

In order to determine the direction of change of intensity of beam passed through the Fabry-Perot etalon, it is necessary to have an enough time to scan wavelength and to have a stable output of the Fabry-Perot etalon for at least such time. Therefore, the center wave-length must be fixed at the ram dip due to the control method and it is impossible to tune it to another wavelength. Further, since there is a rest period of the laser 1, it becomes impossible to shift the wavelength center back to the original value when it is shifted out of the region (c).

SUMMARY OF THE INVENTION

An object of the present invention is to provide a method by which a stabilization and tuning of wavelength of a laser beam can be realized even when environmental temperature, pressure and/or an output of a laser having rest period is changed and a laser for realizing the same method.

The laser wavelength stabilizing method according to the present invention comprises the steps of spectroscopically measuring a portion of a laser beam from a laser oscillator, measuring a spatial intensity distribution of the beam portion, spectroscopically measuring a beam having a specific wavelength, measuring a spatial intensity distribution of the beam having the specific wavelength, analyzing the spatial distribution of the beam intensity on the basis of the spatial intensity distribution of the beam having the specific wavelength and controlling wavelength of the laser oscillator.

The laser according to the present invention comprises a variable wavelength laser oscillator having an optical resonator including a wavelength selection element therein for selecting a wavelength of laser output thereof, a wavelength monitor for spectroscopically measuring a portion of the laser beam derived from the laser oscillator, an image element for measuring spatial intensity distributions of the laser beam passed through the wavelength monitor, an image processing portion for analysing the spatial intensity distributions and controlling oscillation wavelength of the laser oscillator and a servo mechanism responsive to output signal from the image processing portion to drive the element to thereby change the wavelength.

According to one aspect of the present laser, the wavelength monitor is housed in a sealed container and means is provided to maintain temperature of the container constant.

According to another aspect of the present laser, a light source is provided to supply light having a specific wavelength to the wavelength monitor and the image element is adapted to measure spatial intensity distribution of light from the light source additionally.

Since the present method and the laser realizing the same observes intensity distribution of passed light directly, there is no need of wavelength scanning and it is possible to detect any wavelength drift immediately. Further, by operating the servo mechanism until the optical intensity distribution becomes as expected, it is possible to fix wavelength to an arbitary value. In addition, since the wavelength is determined according to a condition of intensity distribution, a variation of laser output does not affect substantially the wavelength selection. Due to the use of the light source for calibration, it is possible to obtain an absolute value of wavelength.

DETAILED DESCRIPTION OF THE PREFERRED EMBODIMENTS

Figure 1:
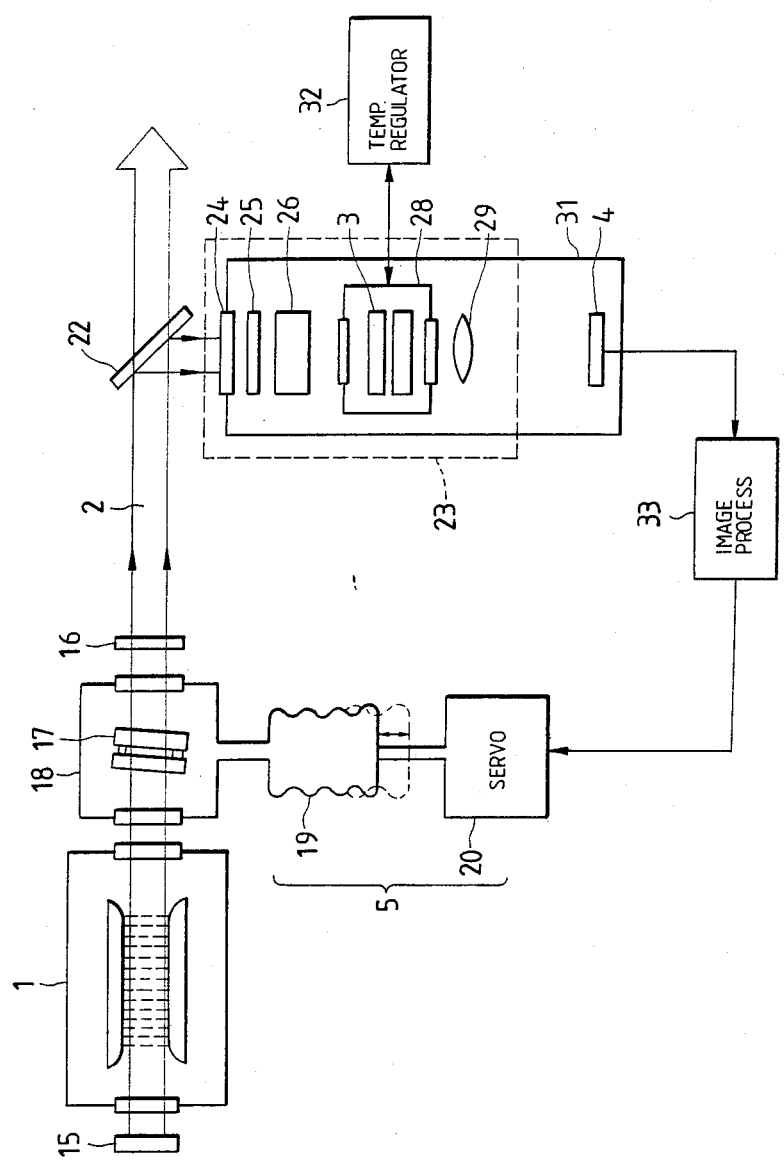
FIG. 1 shows a wavelength stabilized laser according to an embodiment of the present invention.

In FIG. 1, a reference numeral 1 depicts a laser oscillator for producing an oscillation wavelength which is variable by changing an axial length of its resonator defined between a full reflection mirror 15 and a partial reflective mirror 16 or by using a spectroscopic element such as prism, grating or Fabry-Perot etalon. In FIG. 1, a Fabry-Perot etalon 17 housed in a gas filled, sealing container 18 is used to tune oscillation wavelength. A reference numeral 2 depicts a laser beam derived from the partial reflective mirror 16, a portion of which is introduced through a mirror 22 to a wavelength monitor 23 which is, in this embodiment, comosed of an interference filter 24 for allowing only the laser beam 2 to pass through, a filter 25 for regulating beam intensity, an integrator 26 for diffusing the beam 2, a Fabry-Perot etalon 3 having a gap and housed in a sealed container 28 and a lens 29. A image element 4 which may be a one-dimensional image sensor for monitoring fringes produced by the Fabry-Perot etalon 3. The elements depicted by reference numerals 3, 4, 24 to 26, 28 and 29 are housed in a optical shielding box 31. The sealed container 18 is communicated with a bellows 19 adapted to be actuated by a servo mechanism 20. A temperature regulator 32 is provided to maintain the Fabry-Perot etalon 3 at a constant temperature.

An image processing portion 33 is provided for analysis of fringe an output of which is connected to the servo mechanism 20.

Wavelength of laser beam 2 from the laser oscillator 1 is determined by various elements thereof. For example, for an excimer laser, a width of oscillation wavelength is several Å in general. However, by using the spectroscopic element 17 which is, in this embodiment, Fabry-Perot etalon, it is possible to narrower the wavelength width. Further, by regulating the spectroscopic element 17, it is possible to set laser wavelength to an arbitrary value within the wavelength width.

In operation, a portion of laser beam 2 obtained as above is introduced to the wavelength monitor 23. In this invention, circular interference fringes obtained by passing light through the Fabry-Perot etalon 3 are used directly. Fringe diameter is related to $\theta$ and, by obtaining $\theta$, wavelength $\lambda$ m is determined according to the equation mentioned previously.

The integrator 26 reduces beam intensity or diffuses beam to obtain a diverging beam component. A portion of the diverging beam component which has $\theta$ satisfying the previously mentioned equation passes through the Fabry-Perot etalon 27 to the lens 29. Light having $\theta$ component is focused to a point on a focal plane separated from an axis of the lens 29 by $f \cdot \theta$ where f is a focal length of the lens 29. The image element 4 observes the position in which light intensity is higher than others to obtain $\theta$ by which $\lambda$ m can be calculated.

Figure 2:
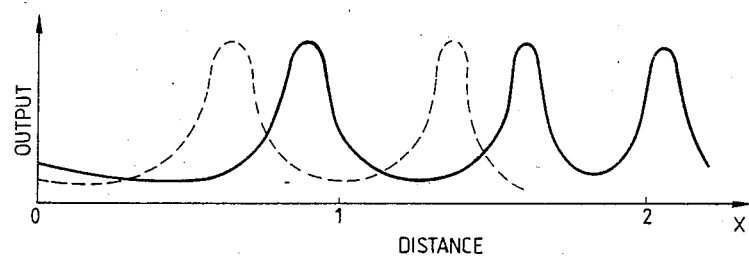
FIG. 2 is a graph showing optical intensity distribution of fringe on a image element of the laser shown in FIG. 1.

Although wavelength $\lambda$ m can be obtained as above, it is difficult to obtain an absolute value of wavelength due to variations of a gap d and refractive index of the Fabry-Perot etalon caused by temperature variation and/or pressure variation. FIG. 2 shows an optical intensity distribution on the image element 4, with output and distance x from a fringe center on ordinate and abscissa, respectively. Respective peaks in the distribution correspond to the order m of the Fabry-Perot etalon and a region between peaks is a free spectrum region in which wavelength an be determined. The free spectrum region depends pon design of the Fabry-Perot etalon and so it is designed to have the free spectrum region wider than an expected wavelength shift range. Since the respective peaks indicate intensity corresponding to wavelength distribution of laser beam, the image processing means 23 processes them to obtain $\theta$. Wave-length $\lambda$ calculated thereby is used to actuate the servo mechanism 10 to actuate the bellows 19 so that the inner pressure of the container 18 is controlled thereby to regulator the oscillator wavelength.

Figure 3:
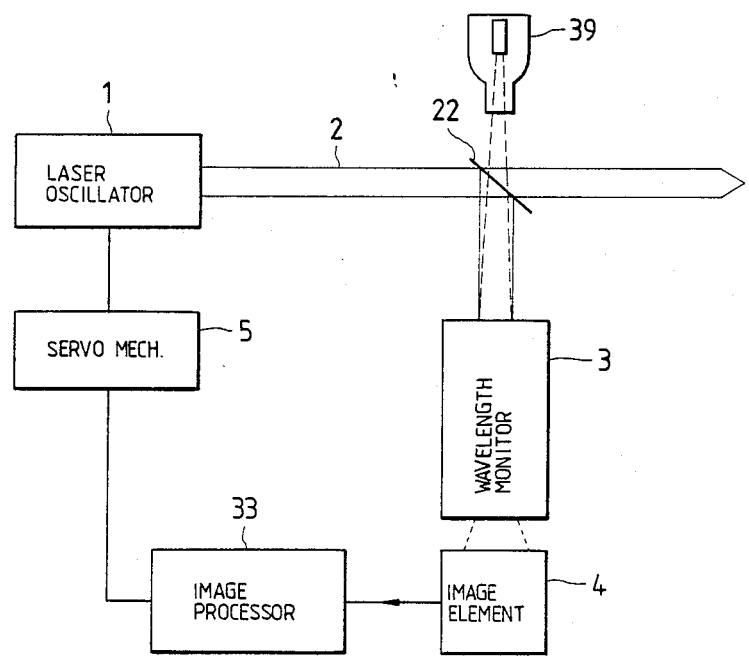
FIG. 3 shows another embodiment of the present laser.

FIG. 3 shows another embodiment of the present laser. In FIG. 3 in which same or corresponding components to those shown in FIG. 1 are depicted by same reference numerals, a light source 39 is used to calibrate wavelength. The light source may be any so long as it has a stable wavelength spectrum. However, in view of easiness of calibration, one having wavelength close to oscillation wavelength of a laser oscillator 1 is preferrable. For example, for KrF laser, spectrum of Fe at 248.327 nm or of Hg at 248.3 nm may be used. Light from the light source 39 is introduced to the wavelength monitor in the same manner as laser beam 2 and, by analysing laser beam wavelength on the basis of intensity distribution detected by the image element, an absolute value of it can be obtained.

Further, by correcting laser oscillation wavelength by a servo mechanism 20 while monitoring shift of intensity distribution, it is possible to obtain laser beam having no fluctuation for a long period of time.

Figure 4:
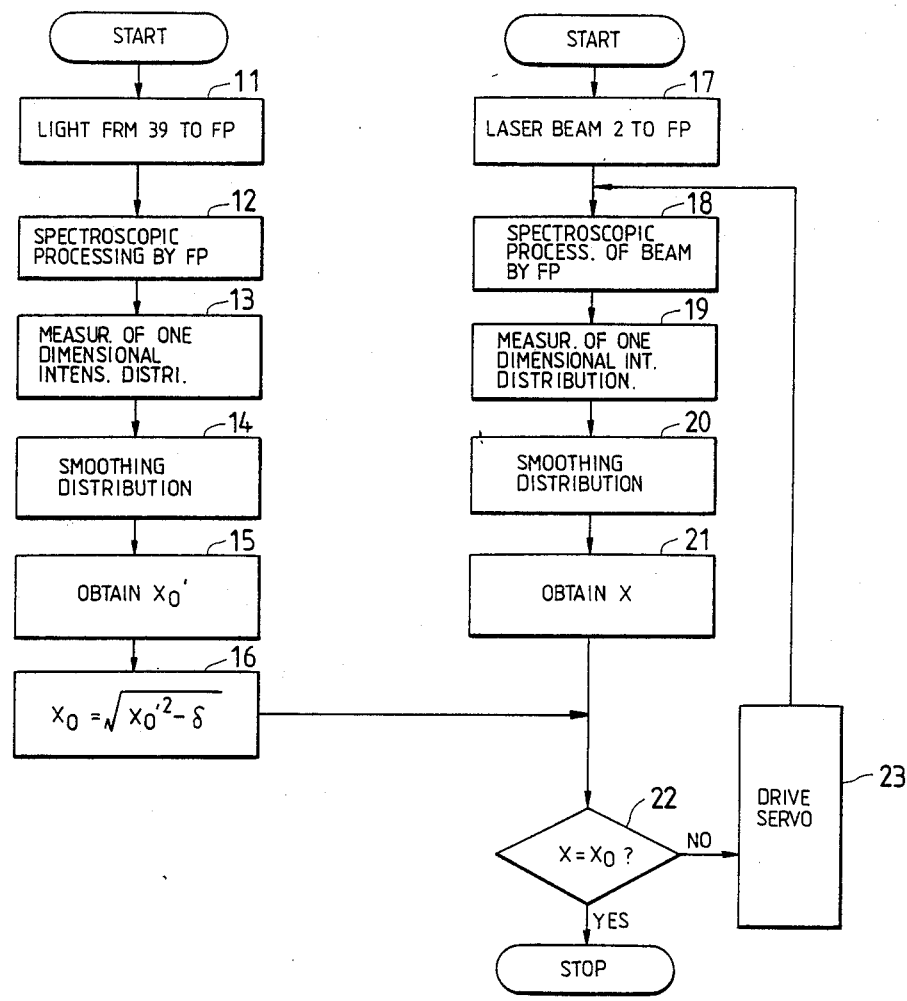
FIG. 4 is a flow-chart showing an operation of the embodiment shown in FIG. 3.
Figure 5:
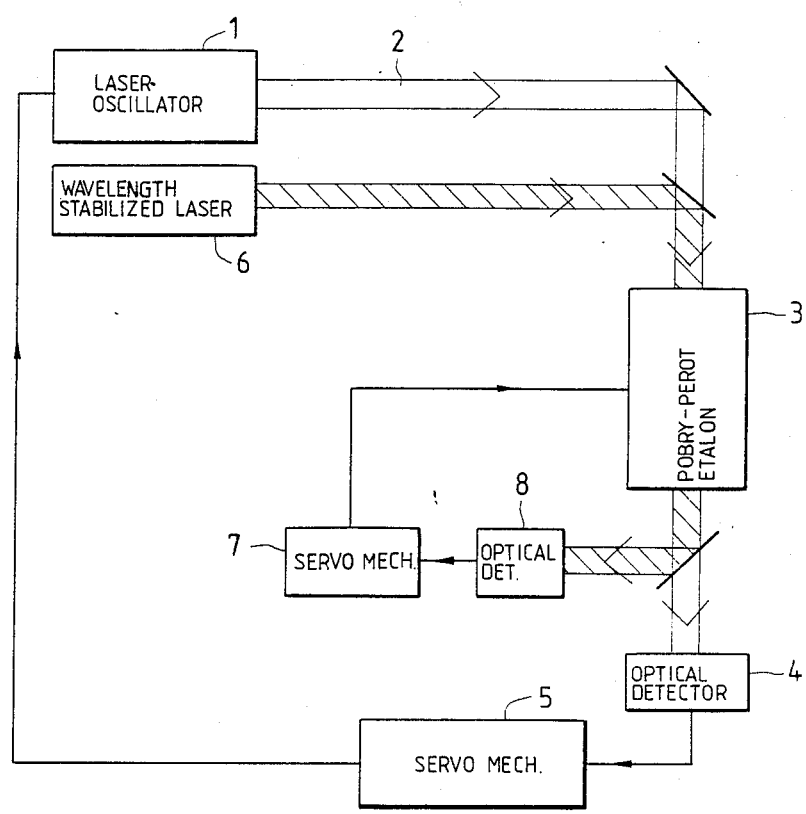
FIG. 5 shows a conventional laser.
Figure 6:
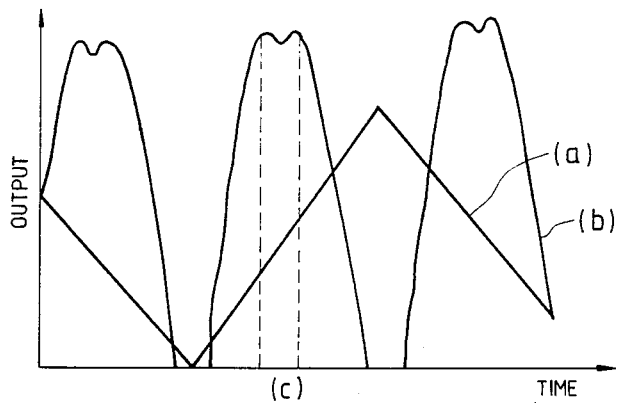
FIG. 6 is a graph showing an output variation to be detected by an optical detector of the laser shown in FIG. 5.

FIG. 4 is a flow-chart showing the present stabilization of laser wavelength. In the step 11, light from the light source 39 is introduced to the Fabry-Perot etalon as a wavelength monitor 23. It is spectroscopically processed thereby in the step 12 and one dimensional intensity distribution thereof is measured by the image element in the step 13. Then, in the step 14, the intensity distribution is smoothed and a position $x_0'$ at which intensity becomes maximum and which corresponds to wavelength $\lambda_0'$ of light from the light source 39 is obtained in the step 15. Since a point shifted from the point $x_0'$ by a specific distance $\delta$ is x corresponding to an aimed wavelength $\lambda_0$, $x_0 = \sqrt{x_0'^2 - \delta}$ is obtained in the step 16.

Further, in the step 17, laser beam 2 from the laser oscillator 1 is introduced to the wavelength monitor 23 in which it is spectroscopically detected by the Fabry-Perot etalon thereof in the step 18 and, in the step 19, one dimensional intensity distribution is measured by the image element. The distribution is smoothed in the step 20 to remove noise component and, in the step 21, a position x at which the intensity becomes maximum is obtained.

Then, in the step 22, the position x obtained in the step 21 is compared with the value $x_0$ obtained in the step 16 as a coordinate of assigned position corresponding to the aimed wavelength. When it is determined that $x > x_0$ or $x < x_0$, the servo mechanism is actuated, in the step 23, to vary wavelength of the laser oscillator 1 so that it becomes $x = x_0$ and the operation is returned to the step 18. This operation is repeated until $x = x_0$. When $x = x_0$ is detected in the step 22, the operation is stopped. The operation steps 14 to 16 and 20 to 23 are performed by the image processing portion 23.

In the above description, the position at which the intensity distribution becomes maximum is obtained with an assumption that the intensity distribution is of Gaussian type. However, for a distribution which is not exact Gaussian type, a position at which an intensity becomes maximum may be determined by other ways by taking the equation (1) into consideration. For example, the position $x_o$ may be obtained from positions $x_1$ and $x_2$ at which the intensity distribution takes a half value according to the following equation:

$$\cos(x_0/f) = \frac{1}{2}\{\cos(x_1/f) + \cos(x_2/f)\}. \quad (2)$$

Therefore, the present invention is intended to also cover the latter scheme.

As is clear from the foregoing, wavelength is calculated from spatial intensity distribution. Therefore, beam intensity variation due to variation of the output of the oscillator does not affect wavelength. Further, it is possible to determine wavelength with a short time exposure if the image element is high sensitive. Further, since any wavelength shift is reflected on the fringe, it is possible to shift wavelength back to the original value easily. Wavelength resolution can be improved by making the focal length of the lens larger or the resolution of the image element higher.

The Fabry-Perot etalon used as the wavelength monitor may be substituted by Fizeau interferrometer or, as mentioned previously, grating or prism. In such case, spatial intensity distribution of diffracted or dispersed light may be measured.

Although, in the embodiment shown in FIG. 3, laser beam 2 from the laser oscillator 1 and light from the light source 39 are separately measured, they can be superimposed. Further, it is, of course, possible to apply the gas sealing and temperature regulation scheme used in the embodiment in FIG. 1 to this embodiment.

As mentioned hereinbefore, according to the present invention, the Fabry-Perot etalons are gas-sealed, respectively, and the temperature regulator is provided for maintaining temperature of the Fabry-Perot etalon at a constant value. Therefore, laser wavelength is stabilized against temperature and/or pressure variation. Further, the use of a reference light causes laser beam wavelength to be stabilized even for a large variation of output power or wavelength of the laser. The wavelength stabilization according to the present invention is effective even for a change of wavelength monitor mechanism.

What is claimed is:

1. A method of stabilizing the laser wavelength of a laser source comprising the steps of:
   supplying a laser beam from a laser light source having a controllable variable wavelength;
   deriving a portion of said laser light beam emitted;
   processing spectroscopically said derived portion of said laser light beam by means of a wavelength monitor mechanism into wavelength segments;
   measuring the spatial intensity distribution of said wavelength segments of said spectroscopically processed beam portion;
   processing spectroscopically a light having a specific wavelength and measuring the spatial intensity distribution thereof;
   analyzing said measured spatial intensity distribution of said spectroscopically processed laser light beam portion in response to said measured spatial intensity distribution of said spectroscopically processed light having said specific wavelength; and
   controlling the wavelength of said laser oscillator in response to the result of said analysis.

2. The method as claimed in claim 1, further comprising the step of:
   obtaining a center value of the spatial intensity distribution of said specific wavelength light to be used as a reference value; and
   wherein said controlling step is performed such that the adjusted center value of the intensity distribution of said variable wavelength laser beam coincides with a position remote from said reference value by a predetermined distance.

3. The method as claimed in claim 2, further comprising:
   maximizing said center values of said intensity distributions of said specific wavelength light and said laser beam intensities at their maximum positions, respectively.

4. The method as claimed in claim 2, wherein said center values of said intensity distributions of said specific wavelength light and said laser beam are intensities at centers of half value widths thereof, respectively.

5. A wavelength stabilized laser comprising:
   a wavelength variable laser oscillator having an optical resonator including therein a wavelength selecting element for selecting laser oscillation wavelength;
   a wavelength monitoring mechanism for spectroscopically processing a portion of a laser beam derived from said laser oscillator;
   a light source for supplying light having a specific wavelength to said wavelength monitoring mechanism;
   an image element for measuring spatial intensity distributions of said laser beam and said light passed through said wavelength monitoring mechanism;
   an intensity processing means for analyzing said intensity distributions and controlling oscillation wavelength of said laser oscillator and for providing an output signal; and a servo mechanism having an input section coupled to the output of said intensity processing means responsive to an output signal from said intensity processing portion to drive said wavelength selecting element in response to output from said intensity processing means.

6. The wavelength stabilized laser as claimed in claim 5, wherein said image processing portion is adjusted to obtain center values of the spatial intensity distributions of said specific wavelength light and said laser beam, and to control said wavelength of said laser beam in response to comparisons of said center values.

7. The wavelength stabilized laser as claimed in claim 6, wherein said center values obtained are intensities of the spatial intensity distribution of said laser beam and said light at positions at which the intensities thereof are at their respective maximums.

8. The wavelength stabilized laser as claimed in claim 6, wherein the center values obtained by said image processing portion are the intensities at centers of half value widths of said intensity distributions, respectively.

9. The wavelength stabilized laser as claimed in any one of claim 5, 6, 7 or 8, wherein said wavelength monitoring mechanism comprises;

a Fabry-Perot etalon; and said image element measures a spatial intensity distribution of an interference pattern produced by said laser beam and said light passing through said Fabry-Petor etalon.

10. The wavelength stabilized laser as claimed in claim 9, wherein said Fabry-Perot etalon is sealed in a sealing container, and further comprising:

a temperature regulation means for holding temperature of said container at a predetermined value.

11. The wavelength stabilized laser as claimed in any one of claims 5, 6, 7 or 8, wherein said wavelength monitoring mechanism comprising:

a Fizeau interferrometer and said image element measures a spatial intensity distribution of an interference pattern produced by said laser beam and said light passing through said Fizeau interferrometer.

12. The wavelength stabilized laser as claimed in any one of claims 5, 6, 7 or 8, wherein said wavelength monitoring mechanism comprises:

a grating and said image element measures a spatial intensity distribution of a diffracted light produced by said laser beam and said light passing through said grating.

13. The wavelength stabilized laser as claimed in any one of claims 5, 6, 7 or 8, wherein said wavelength monitoring mechanism comprises:

a prism and said image element measures a spatial intensity distribution of a dispersed light produced by said laser beam and said light passing through said prism.

* * * * *